United States Patent
Bruneau et al.

(10) Patent No.: US 12,331,221 B2
(45) Date of Patent: Jun. 17, 2025

(54) USE OF A PARTICULAR ETHYLENE-BUTYL ACRYLATE COPOLYMER IN A HOT-MELT ADHESIVE COMPOSITION THAT IS TRANSPARENT IN THE MOLTEN STATE

(71) Applicant: SK GLOBAL CHEMICAL CO., LTD., Seoul (KR)

(72) Inventors: Jean-Michel Bruneau, Gisors (FR); Martine Le Nobin, Saint-Aubin le Guichard (FR); Jean-Philippe Soriano, Lyons (FR); Florence Quetel, Combon (FR)

(73) Assignee: SK GLOBAL CHEMICAL CO., LTD., Seoul (KR)

( * ) Notice: Subject to any disclaimer, the term of this patent is extended or adjusted under 35 U.S.C. 154(b) by 333 days.

(21) Appl. No.: 16/468,317

(22) PCT Filed: Dec. 22, 2017

(86) PCT No.: PCT/FR2017/053821
§ 371 (c)(1),
(2) Date: Jun. 11, 2019

(87) PCT Pub. No.: WO2018/115789
PCT Pub. Date: Jun. 28, 2018

(65) Prior Publication Data
US 2020/0071575 A1    Mar. 5, 2020

(30) Foreign Application Priority Data

Dec. 22, 2016 (FR) ........................................ 1663224

(51) Int. Cl.
| | | |
|---|---|---|
| *C09J 123/08* | (2006.01) | |
| *C08K 5/01* | (2006.01) | |
| *C09J 7/35* | (2018.01) | |
| *C09J 133/08* | (2006.01) | |
| *C09J 191/06* | (2006.01) | |

(52) U.S. Cl.
CPC ............ *C09J 123/0869* (2013.01); *C08K 5/01* (2013.01); *C09J 7/35* (2018.01); *C09J 133/08* (2013.01); *C09J 191/06* (2013.01); *C09J 2203/334* (2013.01); *C09J 2301/304* (2020.08); *C09J 2301/312* (2020.08); *C09J 2301/408* (2020.08); *C09J 2423/04* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 4,025,274 | A | * | 5/1977 | Uemura ................ B29C 48/395 425/378.1 |
| 5,310,803 | A | | 5/1994 | Hansen |
| 5,443,903 | A | * | 8/1995 | Hansen .................... C09J 9/005 428/350 |
| 5,500,472 | A | * | 3/1996 | Liedermooy .......... C09J 191/06 524/502 |
| 5,994,437 | A | | 11/1999 | Lebez et al. |
| 6,946,528 | B2 | * | 9/2005 | Domine ................ C08F 210/02 526/64 |
| 7,070,051 | B2 | * | 7/2006 | Kanner ............ A61B 17/06133 206/460 |
| 2007/0167547 | A1 | | 7/2007 | Kulkarni et al. |
| 2008/0249216 | A1 | | 10/2008 | Gong et al. |
| 2008/0249233 | A1 | * | 10/2008 | Haner ................ C09J 123/0853 524/529 |
| 2013/0109801 | A1 | * | 5/2013 | Coffey ................ C08L 23/0869 525/229 |

FOREIGN PATENT DOCUMENTS

| | | |
|---|---|---|
| EP | 0300158 A2 | 1/1989 |
| EP | 0547797 A1 | 6/1993 |
| JP | H5239285 A | 9/1993 |
| JP | H 083525 A | 1/1996 |
| JP | 2010523770 A | 7/2010 |
| WO | 02060993 A1 | 8/2002 |

OTHER PUBLICATIONS

ISA/EP; International Search Report and Written Opinion for International Patent Application No. PCT/FR2017/053821 dated Mar. 19, 2018, 11 pages.
Office Action (Notice of Reasons for Refusal) issued on Sep. 3, 2021, by the Japanese Patent Office in corresponding Japanese Patent Application No. 2019-533650, and an English Translation of the Office Action. (8 pages).
Office Action (Notice of Reasons for Refusal) issued on May 10, 2022, by the Japanese Patent Office in corresponding Japanese Patent Application No. 2019-533650, and an English Translation of the Office Action. (6 pages).

* cited by examiner

*Primary Examiner* — Frank D Ducheneaux
(74) *Attorney, Agent, or Firm* — Buchanan Ingersoll & Rooney PC

(57) ABSTRACT

A thermo-fusible adhesive composition comprising at least one ethylene and butyl acrylate copolymer cohesion agent. The thermo-fusible adhesive composition may further comprise at least one adhesive hydrocarbon resin, preferably hydrogenated, and at least one ethylene and acrylate copolymer. The present disclosure also relates to the use of the corresponding thermo-fusible adhesive compositions in the production of manufactured articles.

5 Claims, No Drawings

USE OF A PARTICULAR ETHYLENE-BUTYL ACRYLATE COPOLYMER IN A HOT-MELT ADHESIVE COMPOSITION THAT IS TRANSPARENT IN THE MOLTEN STATE

CROSS-REFERENCE TO RELATED APPLICATIONS

This application is a U.S. National Stage application of International Application No. PCT/FR2017/053821, filed on 22 Dec. 2017, which claims the benefit of French Patent Application No. 1663224, filed 22 Dec. 2016.

The present invention relates to the use of at least one ethylene and butyl acrylate copolymer, as defined below, as a cohesion agent, in a hot-melt adhesive composition.

The invention also relates to a hot-melt adhesive composition comprising at least one adhesive hydrocarbon resin, preferably hydrogenated, and at least one ethylene and acrylate copolymer as defined below.

The invention thus relates to the use of the corresponding hot-melt adhesive composition for the production of a manufactured article.

Hot-melt adhesive and hot-melt glue compositions are solid at ambient temperature, most often with an oblong shape, for example sticks, and are intended to be melted at high temperature, for example a temperature ranging from 130 to 180° C. in order to be applied to a substrate in the liquid state. After application, during cooling of the compositions to a temperature below the melting point, the adhesive hold happens quickly.

These compositions therefore have the advantages of being easily handled and stored, adhering almost instantly, meaning in a very short hold time, being suited for application on highly varied substrates or materials, and being solvent-free.

Such compositions are commonly used in many technical fields in order to assemble a large variety of substrates or materials together for making manufactured articles.

As examples, these compositions can be used in the packaging field, in particular for cardboard or plastic packaging, in particular for packaging containing pharmaceutical products or foodstuffs which could be refrigerated at temperatures between −1° C. and ambient temperature, or frozen at temperatures below −18° C., or even products coming from an industrial process at a temperature of about 40° C.

Such compositions can also be used in the automotive field, for example in the assembly of components located inside the instrument panel of a vehicle, in the manufacture of book bindings, in the wood industry, in particular in the application of edge banding, in labeling or in any other type of field.

The result of this is that, whatever the temperature, hot-melt adhesive compositions must meet some number of criteria, especially a quick adhesive hold, good thermal stability, good mechanical resistance and increased tolerance to external attacks, in order to satisfactorily address the requirements imposed in these various technical fields.

For example, in the packaging field, especially for cardboard or plastic packaging, the manufactured articles, such as boxes, bags, trays or crates, are most often assembled with automatic equipment, for example a hot-melt adhesive distribution system on packaging lines, where the speed and production rate of the articles are important parameters to keep in consideration. Hence, the hold time of the dispensed hot-melt adhesive compositions must be sufficiently short for reducing the risk of slowing during the production cycle.

The hot-melt adhesive compositions must also have a fairly low viscosity, preferably below 1500 mPa·s, more preferably ranging from about 700 to 1000 mPa·s, measured at a temperature of 170° C., in order to be applied in small quantities and to obtain a good wetting on the substrates.

Hot-melt adhesive compositions must also provide, in the molten state, i.e. as a liquid, an increased thermal stability for several days in order to minimize the risks of shut down during the production cycle and the maintenance costs for the equipment parts.

In fact, hot-melt adhesives can gel or be partially charred in the tank of the distribution system which in the long term can in particular result in the clogging of the feed tubes, nozzles and/or filters of the system. The blocking of these parts can thus lead to production shutdowns prolonged to varying degrees and also an increase in the frequency of emptying operations and a resulting increase in equipment maintenance costs.

Hot-melt adhesive compositions are usually transparent or translucent, colorless or have a straw, tan or amber color. In the case of the packaging field, it is preferable to dispense an adhesive composition that is transparent in the molten state with a minimum of coloring in order to be able to check the development thereof while hot i.e. the thermal stability thereof in the molten state, in particular for determining the presence of gels and traces of charring, so as to prevent the disadvantages mentioned above.

In other words, because of the transparency of the adhesive composition in the molten state, users can more easily monitor the possible breakdown thereof during the production cycle so that they can better anticipate the shutdown risks in a production line and reduce maintenance costs.

The transparency of this type of adhesive composition can depend on the components used. Hot-melt adhesive compositions comprise mostly at least one adhesive resin (also called tackifier resin) and at least one polymer or copolymer different from the resin, and, as a minority component, at least one wax and at least one antioxidant.

The role of adhesive resins is to increase the tack (meaning the sticking or adhering power) of a molten hot-melt adhesive composition. Generally, these resins are compounds having a low molecular weight with a high glass transition temperature. The adhesive resins used can be chosen from the group consisting of rosins and derivatives thereof, terpenes and modified terpenes (such as described in patent EP 0 300158 B1), aliphatic, cycloaliphatic and aromatic resins such as C5 aliphatic resins, C9 aromatic resins, C5/C9 aliphatic/aromatic resins, and hydrogenated hydrocarbon resins.

Hydrogenated hydrocarbon resins are particularly preferred in the packaging field because they contribute to the transparency and the minimization of coloring in hot-melt adhesive compositions.

The role of the polymers or copolymers, different than the previously described adhesive resins, is to provide cohesion to the molten hot-melt adhesive composition, meaning to allow the composition to resist a separation depending on the applied stress (for example a pulling or shearing stress) at both ambient temperature and at higher temperatures.

In other words, the polymers or copolymers used as cohesion agents have the role of improving the peel strength and also the static shear strength (i.e. creep strength) of a molten hot-melt adhesive composition.

Ethylene-vinyl acetate (EVA) copolymers are commonly used as cohesion agents because they have the advantage of being compatible with many adhesive waxes and resins which allows them to be used in varied domains.

However, ethylene-vinyl acetate copolymers have a tendency to impair the thermal stability of molten hot-melt adhesive compositions. In particular, such compositions tend to gel and char, completely or partially, when they are heated over several days, which leads to the previously described disadvantages.

As a variant, ethylene and acrylate copolymers, such as ethylene and alkyl (meth)acrylate copolymers, in particular ethylene and n-butyl acrylate copolymers, are also used as a cohesion agent in adhesive compositions because they have the advantage of improving the thermal stability thereof. These copolymers are prepared in an autoclave or tubular reaction vessel. Ethylene and acrylate copolymers, obtained in a tubular reaction vessel, are preferably used in the packaging domain because they have a high melting point. Further, ethylene and acrylate copolymers also have a low glass transition temperature so they can be flexible at low temperature, which makes them easier to use in packaging for frozen products.

However, hot-melt adhesive compositions based on ethylene and n-butyl acrylate copolymers, currently used, in particular the ethylene copolymer containing at least 35% by weight of n-butyl acrylate, have a cloudy appearance in the molten state which makes it difficult to check their thermal stability when hot and increases the risks of production shut down and maintenance costs because of unexpected gelification or charring thereof.

Additionally, hot-melt adhesive compositions based on this type of ethylene and n-butyl acetate copolymer have a high cloud point, meaning a high temperature starting at which a liquid becomes cloudy while cooling.

Further, polyolefins, in particular polyethylene obtained by metallocene catalysis, are also frequently used in the packaging domain, in particular for packaging, as a cohesion agent, in the preparation of hot-melt adhesive compositions.

Such compositions generally have good properties, in particular in terms of thermal stability and viscosity, and also a high shearing adhesion failure temperature.

However, polyolefins prepared by metallocene catalysis are not compatible with some adhesive resins, including rosin resins, which can limit their use.

Thus one of the objectives of the present invention is to propose a cohesion agent not having the disadvantages indicated above, which is in particular capable of leading to hot-melt adhesive compositions transparent in the molten state so as to be able to easily check their hot thermal stability for the purpose of minimizing or managing the risks related to gelification and charring of the compositions.

In particular, one of the objectives of the present invention is to propose a cohesion agent that can improve the transparency in the molten state of the hot-melt adhesive compositions while also giving them good properties.

There is therefore a real need to offer hot-melt adhesive compositions which are not only transparent in the molten state but also have good properties, especially in terms of thermal stability, viscosity and shearing adhesion failure temperature.

The object of the present invention is therefore in particular the use of at least one ethylene and n-butyl acrylate copolymer having a melt flow index strictly over 400 and strictly less than 750 g/10 minutes, measured at a temperature of 190° C., and comprising an n-butyl acrylate concentration greater than or equal to 18% by weight and strictly less than 33% by weight, calculated relative to the total weight of the copolymer, as a cohesion agent, in a hot-melt adhesive composition.

By using the ethylene and n-butyl acrylate copolymer according to the invention, hot-melt adhesive compositions which have the advantage of being transparent in the molten state can be obtained.

Thus the thermal stability of the hot-melt adhesive compositions obtained based on such a copolymer is easier to control, in particular relating to monitoring for the presence of gels or traces of char, which makes it possible to better anticipate the shutdown risks in a production cycle of articles manufactured with such adhesive compositions and to reduce the maintenance costs.

In other words, by using such a copolymer, hot-melt adhesive compositions can be prepared that are transparent in the molten state so that changes thereto while hot can be monitored more effectively during application thereof.

More precisely, the breakdown of the hot-melt adhesive composition can be identified or monitored with the ethylene and n-butyl acrylate copolymer according to the invention.

The transparency of the hot-melt adhesive compositions is accompanied by a minimum of coloration. Thus, the ethylene and n-butyl acrylate copolymer conforming to the invention leads to transparent and clear compositions.

The use of an ethylene and n-butyl acrylate copolymer according to the invention therefore contributes to extending the life of automatic equipment used for dispensing hot-melt adhesive compositions.

In fact with the ethylene and n-butyl acrylate copolymer according to the invention, leaving the hot-melt adhesive composition to gelify too long can be avoided so that the risks of blocking of various parts of automatic equipment intended to dispense such a composition, in particular filters, nozzles and/or supply tubes for such equipment, can be avoided.

Further, the ethylene and n-butyl acrylate copolymer according to the invention contributes to minimizing the risks of charring of the hot-melt adhesive composition because of heating too long in the reservoir or generator of such equipment.

In particular, unlike an ethylene and n-butyl acrylate copolymer containing an n-butyl acrylate concentration of at least 35% by weight, calculated relative to the total weight of the copolymer, the use of an ethylene and n-butyl acrylate copolymer according to the present invention allows the preparation of hot-melt adhesive compositions which are transparent in the molten state, meaning in liquid form.

In the same way, the use of an ethylene and n-butyl acrylate copolymer according to the present invention allows the preparation of hot-melt adhesive compositions having a low cloud point, in particular below that of a hot-melt adhesive composition prepared with an ethylene and n-butyl acrylate copolymer containing an n-butyl acrylate concentration of at least 35% by weight.

The object of the invention is also a hot-melt adhesive composition having at least one adhesive hydrocarbon resin and at least one ethylene and n-butyl acrylate copolymer having a melt flow index strictly over 400 and strictly less than 750 g/10 minutes measured at a temperature of 190° C., in particular measured at a temperature of 190° C. under a 2.16 kg load, and comprising an n-butyl acrylate concentration greater than or equal to 18% by weight and strictly less than 33% by weight calculated relative to the total weight of the copolymer.

The hot-melt adhesive composition according to the invention is transparent in the molten state, meaning a liquid form at a temperature over the melting point thereof, and has satisfactory properties in the molten state, in particular in terms of thermal stability, viscosity and shearing adhesion failure temperature.

In particular, the composition according to the invention is thermally stable with a minimum of coloration.

"Thermally stable," in the meaning of the present invention, is understood to mean a composition which does not lead to the formation of gels and does not have traces of char in the molten state over an extended time, for example seven days or longer.

Thermal stability can also be evaluated by measuring how the viscosity of the molten adhesive composition according to the invention changes over an extended time, for example 7 days or longer.

Further, the hot-melt adhesive composition according to the invention is not only thermally stable but also has very little color in the molten state, i.e. in liquid form, over an extended time, for example seven days or longer.

The coloring of the adhesive composition according to the invention in the molten state can be evaluated by measuring the yellowing index (YI) over the same time.

The hot-melt adhesive composition according to the invention has a viscosity comparable or even lower than that obtained with a hot-melt adhesive composition containing at least one polyolefin, in particular a polyethylene, prepared by metallocene catalysis.

The viscosity of the hot-melt adhesive composition is measured in the molten state using a viscometer equipped with an SC4-27 spindle at a temperature above the melting point of said composition, generally at temperatures over 130° C. and preferably ranging from 130° C. to 180° C.

Further, the hot-melt adhesive composition according to the invention has a shearing adhesion failure temperature higher than a hot-melt adhesive composition containing at least one polyolefin, in particular a polyethylene, prepared by metallocene catalysis.

"Shearing adhesion failure temperature," in the meaning of the present invention, is understood to mean the temperature at which the composition is no longer adhesive under shearing, meaning when a shearing stress is applied to the composition in the molten state.

The composition according to the invention also has a lower cloud point than a hot-melt adhesive composition containing at least one ethylene copolymer containing at least 35% by weight of n-butyl acrylate calculated relative to the total weight of the copolymer.

The present invention also relates to the use of the hot-melt adhesive composition according to the invention for the production of a manufactured article, preferably the production of packaging such as a carton, case, tray, packaging wrap or a bag.

Another object of the present invention also relates to a manufactured article comprising at least one hot-melt adhesive composition such as defined above.

Other features and advantages of the invention will appear more clearly upon reading the following description and examples.

In the following, and unless otherwise indicated, the limits of the domain of values are included in this domain.

The expression "at least one" is equivalent to the expression "one or more."

Use of the Copolymer

As previously indicated, the invention relates to the use of at least one ethylene and n-butyl acrylate copolymer having a melt flow index strictly over 400 and strictly less than 750 g/10 minutes, measured at a temperature of 190° C., in particular measured at a temperature of 190° C. under a 2.16 kg load, and comprising an n-butyl acrylate concentration greater than or equal to 18% by weight and less than 33% by weight calculated relative to the total weight of the copolymer, as a cohesion agent, in a hot-melt adhesive composition.

In the meaning of the present invention, cohesion agent is understood to mean a compound capable of contributing an internal resistance to the molten hot-melt adhesive composition that, during application of a stress, opposes the breakup thereof (or even splitting or division thereof).

This property depends on the chemical and physical forces provided by the cohesion agent.

Thus, the ethylene and n-butyl acrylate copolymer according to the invention provides cohesion to the molten hot-melt adhesive composition by providing an internal resistance to the separation under the applied stress, for example a pulling stress or a shearing stress.

The ethylene and n-butyl acrylate copolymer according to the present invention is, for example, capable of improving the peel strength and also the static shear strength (i.e. creep strength) of the molten hot-melt adhesive composition.

Thus, the cohesion can be evaluated by measuring the peel strength and the static shear strength of the hot-melt adhesive composition.

The peel strength is measured using a peeling test which consists of pulling on the adhesive composition, once adhered to a substrate, and measuring the force necessary for the separation and also the total energy expended.

The static shear strengths are evaluated by applying the molten hot-melt adhesive composition between two substrates and applying a given shear stress to one of the substrates in order to evaluate the sliding of one substrate relative to the other.

The static shear strength of the molten hot-melt adhesive composition is generally measured according to the ASTM D4498-07 standard.

The static shear strength is evaluated by measuring the hot breaking temperature under shear (or also called the maximum temperature supported under shear or shear adhesion failure temperature).

Preferably, the cohesion of the hot-melt adhesive composition according to the invention is evaluated by measuring the hot breaking temperature under shear (shear adhesion failure temperature).

The melt flow index of the copolymer corresponds to the mass of the molten copolymer flowing through an oblong shaped extruder, in particular cylindrical shape, over a given time under given temperature conditions.

The melt flow index of the polymer is measured according to the methods commonly used for characterizing thermoplastics with which to obtain information on the extrudability and the possibilities of shaping the material such as described in the standards ASTM D1238 or NF T51-06 at a temperature of 190° C. in particular measured at a temperature of 190° C. under a load of 2.16 kg.

Preferably, the melt flow index of the copolymer according to the invention varies from 410 to 740 g/10 minutes, measured at a temperature of 190° C. (in particular measured at a temperature of 190° C. under a load of 2.16 kg), preferably from 420 to 720 g/10 minutes, and even more preferably from 450 to 700 g/10 minutes.

The ethylene and n-butyl acrylate copolymer comprises an n-butyl acrylate concentration ranging from 18% by weight, which is strictly less than 33% by weight, calculated relative to the total weight of the copolymer.

Preferably, the ethylene and n-butyl acrylate copolymer comprises an n-butyl acrylate concentration ranging from 18% by weight to 32% by weight, calculated relative to the total weight of the copolymer.

More preferably, the ethylene and n-butyl acrylate copolymer comprises an n-butyl acrylate concentration of 25 to 31% by weight, relative to the total weight of the copolymer.

Also preferably, the ethylene and n-butyl acrylate copolymer comprises from 26 to 29% n-butyl acrylate by weight relative to the total weight of the copolymer.

Advantageously, the ethylene and n-butyl acrylate copolymer comprises 28% n-butyl acrylate by weight relative to the total weight of the copolymer and a melt flow index ranging from 450 to 750 g/10 minutes.

The ethylene and n-butyl acrylate copolymer has a molecular weight generally ranging from 20,000 to 50,000 g per mole.

The ethylene and n-butyl acrylate copolymer according to the present invention results from free-radical copolymerization under high pressure in a tubular reaction vessel.

Preferably, the hot-melt adhesive composition of the present invention comprises less than 20% by weight, more preferably less than 10% by weight, less than 5% by weight, even preferably less than 1% by weight of ethylene and vinyl acetate copolymer relative to the total weight of the ethylene and vinyl acetate copolymer plus the ethylene and n-butyl acrylate copolymer of said composition.

In other words, preferably the ethylene and n-butyl acrylate copolymer as defined below is combined with less than 20% by weight, more preferably less than 10% by weight, less than 5% by weight, even preferably less than 1% by weight of ethylene and vinyl acetate copolymer relative to the total weight of the ethylene and vinyl acetate copolymer plus the ethylene and n-butyl acrylate copolymer of said composition.

Preferably, the hot-melt adhesive composition of the present invention does not comprise ethylene and vinyl acetate copolymer.

In other words, preferably the ethylene and n-butyl acrylate copolymer as defined below is not combined with an ethylene and vinyl acetate copolymer.

As a variant, the invention also relates to the use of at least one ethylene and n-butyl acrylate copolymer, as previously defined, for the preparation of a hot-melt adhesive composition.

Again as a variant, the invention relates to a method for preparation of a hot-melt adhesive composition comprising at least one ethylene and n-butyl acrylate copolymer as previously defined.

Hot-Melt Adhesive Composition

As indicated above, the hot-melt adhesive composition according to the invention comprises:
  at least one adhesive hydrocarbon resin different from the ethylene and n-butyl acrylate copolymer according to the invention, and
  at least one ethylene and n-butyl acrylate copolymer as previously defined.

In the meaning of the present invention, the resin is a molecule or macromolecule, generally a chemical compound or a polymer having a low molecular mass compared to the usual polymers.

The adhesive hydrocarbon resin generally has a molecular weight ranging from 200 to 1000, preferably ranging from 200 to 900 g per mole.

The resin is referred to as adhesive because it serves to give tack almost instantaneously to the hot-melt adhesive composition.

In other words, an adhesive resin gives a bonding character to the composition almost upon contact thereof with the substrate.

Preferably the hydrocarbon resin is hydrogenated.

The hydrogenated adhesive hydrocarbon resin is preferably chosen from the group consisting of aliphatic hydrogenated hydrocarbon resins, cycloaliphatic hydrogenated hydrocarbon resins, partially or totally hydrogenated aromatic hydrocarbon resins, aromatic-modified aliphatic and/or cycloaliphatic hydrogenated hydrocarbon resins, aliphatic or cycloaliphatic-modified aromatic hydrogenated hydrocarbon resins and mixtures thereof.

Preferably, the adhesive hydrogenated hydrocarbon resin is chosen from the group consisting of cycloaliphatic hydrogenated hydrocarbon resins, aliphatic and cycloaliphatic hydrogenated hydrocarbon resins, aliphatic-modified aromatic hydrogenated hydrocarbon resins and mixtures thereof.

More preferably, the hydrogenated hydrocarbon adhesive resin is chosen from the group consisting of cycloaliphatic hydrogenated hydrocarbon resins, aliphatic and cycloaliphatic hydrogenated hydrocarbon resins, styrene/methylstyrene/indene copolymer.

Preferably, the hydrocarbon adhesive resin comprises a ring and ball (R&B) softening point ranging from 75 to 135° C. and more preferably ranging from 80 to 100° C.

In the meaning of the present invention the softening point corresponds to the temperature at which the resin reaches a certain degree of softening under standardized conditions, in particular according to the NF EN 1238 standard.

The hydrogenated hydrocarbon resin is preferably chosen in the group consisting of:
  aliphatic-modified aromatic hydrogenated hydrocarbon resins having a low molecular weight such as those sold by Eastman under the trade name Regalite™ R1100;
  cycloaliphatic hydrogenated hydrocarbon resins such as those sold by Exxon under the trade name Escorez 5380;
  cycloaliphatic/aliphatic hydrogenated hydrocarbon resins such as those sold by Kolon under the trade name Sukorez SU-500.

The hydrogenated hydrocarbon resin can be present in the hot-melt adhesive composition at a concentration ranging from 40 to 60% by weight and more preferably at a concentration ranging from 45 to 55% by weight relative to the total weight of the composition.

The ethylene and n-butyl acrylate copolymer can be present in the hot-melt adhesive composition at a concentration ranging from 30 to 40% by weight preferably in a concentration ranging from 32 to 37% by weight relative to the total weight of the composition.

Preferably, the hot-melt adhesive composition of the present invention comprises less than 20% by weight, more preferably less than 10% by weight, less than 5% by weight, even preferably less than 1% by weight of ethylene and vinyl acetate copolymer relative to the total weight of the ethylene and vinyl acetate copolymer plus the ethylene and n-butyl acrylate copolymer of said composition.

More preferably, the hot-melt adhesive composition of the present invention does not comprise ethylene and vinyl acetate copolymer.

The hot-melt adhesive composition can further comprise at least one wax.

The wax is preferably chosen in the group consisting of paraffin waxes, microcrystalline paraffin waxes, Fischer-Tropsch waxes (i.e. waxes resulting from a Fischer-Tropsch process involving carbon monoxide and hydrogen), oxidized Fischer Tropsch waxes, and hydrogenated stearamide waxes.

Preferably, the wax is selected from the group consisting of paraffin waxes, Fischer-Tropsch waxes and mixtures thereof.

More preferably, the wax is chosen from the group consisting of mixtures of paraffin wax and Fischer-Tropsch waxes.

The paraffin wax has a low molecular weight and consequently a low viscosity. It serves to improve the flexibility and elongation properties of the adhesive composition.

The Fisher-Tropsch waxes have a high melting point, a low viscosity and also an excellent hardness and thermal stability.

In particular, the wax present in the hot-melt adhesive composition corresponds to a mixture of the paraffin wax, sold under the name Salsowax 6805, and a Fisher-Tropsch wax sold under the name Salsowax C105.

With the waxes, the opening time and also the attachment time of the molten hot-melt adhesive composition are improved.

In the meaning of the present invention, the opening time corresponds to the time during which the composition is applied in the molten state and remains sufficiently in this state for forming an adhering bond with the second substrate meant to cover over said composition.

In the meaning of the present invention, the attachment time corresponds to the time during which a minimum holding pressure is required for getting adhesion.

The wax can be present in the hot-melt adhesive composition in a concentration ranging from 10 to 20% by weight relative to the total weight of the composition.

Preferably, the hot-melt adhesive composition comprises a paraffin wax with a concentration of 10% by weight and a Fischer-Tropsch wax with a concentration of 5% by weight, relative to the total weight of the composition.

The hot-melt adhesive composition can further comprise at least one stabilizer or antioxidant.

In the meaning of the present invention the stabilizer or antioxidant serve to protect the hot-melt adhesive composition from breakdowns induced by the action of oxygen which are caused by heat or light.

Preferably, the stabilizer or antioxidant is chosen among phenolic compounds such as those sold by Ciba under the name Irganox.

Other oxidizers such as phosphites, thioether compounds or secondary amines serve to improve the thermal stability.

The hot-melt adhesive composition can comprise from 0.1 to 1% by weight of stabilizer or antioxidant relative to the total weight of the composition.

The hot-melt adhesive composition can also comprise a plasticizer.

Preferably the hot-melt adhesive composition comprises:
at least one hydrogenated hydrocarbon adhesive resin, different from the ethylene and n-butyl acrylate copolymer according to the invention, chosen from the group consisting of aliphatic-modified aromatic hydrogenated hydrocarbon resins, cycloaliphatic hydrogenated hydrocarbon resins and cycloaliphatic/aliphatic hydrogenated hydrocarbon resins; and
at least one ethylene and n-butyl acrylate copolymer containing an n-butyl acrylate concentration ranging from 18% to 32% by weight, preferably a concentration ranging from 25 to 31% by weight, still more preferably a concentration ranging from 26 to 29% by weight calculated relative to the total weight of the copolymer and a flow index ranging from 420 to 720 g/10 minutes measured at a temperature of 190° C. (in particular measured at a temperature of 190° C. under a load of 2.16 kg), preferably ranging from 450 to 700 g/10 minutes.

According to this embodiment, the ethylene and n-butyl acrylate copolymer advantageously contains 28% n-butyl acrylate by weight calculated relative to the total weight of the copolymer and a melt flow index ranging from 450 to 700 g/10 minutes measured at a temperature of 190° C., in particular measured at a temperature of 190° C. under a load of 2.16 kg.

Conforming with this embodiment, the hot-melt adhesive composition preferably comprises a hydrogenated hydrocarbon adhesive resin at a concentration ranging from 40 to 60% by weight and more preferably at a concentration ranging from 45 to 55% by weight relative to the total weight of the composition and an ethylene and n-butyl acrylate copolymer ranging from 30 to 40% by weight, preferably at a concentration ranging from 32 to 37% by weight relative to the total weight of the composition.

According to this embodiment, the hot-melt adhesive composition may further comprise at least one wax chosen from the group consisting of paraffin waxes, Fischer-Tropsch waxes and mixtures thereof, and more specifically mixtures thereof.

Advantageously, the hot-melt adhesive composition comprises:
50% by weight of a hydrogenated hydrocarbon adhesive resin, relative to the total weight of the adhesive composition;
35% by weight of an ethylene and n-butyl acrylate copolymer, relative to the total weight of the adhesive composition, containing an n-butyl acrylate concentration of 28% by weight, calculated relative to the total weight of the copolymer, having a melt flow index strictly greater than 400 and strictly less than 750 g/10 minutes, preferably ranging from 450 to 700 g/10 minutes, measured at a temperature of 190° C., in particular measured at a temperature of 190° C. under a load of 2.16 kg.

According to this embodiment, the composition can further comprise a wax and an antioxidant.

The hot-melt adhesive composition according to the invention has a viscosity ranging from 300 to 1500 mPa·s, preferably ranging from 700 to 1200 mPa·s, measured at 170° C. using a viscometer equipped with an SC4-27 spindle at a temperature above the melting point of said composition.

As previously indicated, the thermal stability of the molten adhesive composition can also be evaluated by measuring the progression of the viscosity of the adhesive composition according to the invention in the molten state over an extended time, for example seven days or longer.

In this case, thermally stable adhesive composition is understood to mean in particular that under 10% of the viscosity of the molten composition changes after 72 hours, preferably less than 15% after 120 hours at a temperature of 170° C.

The hot-melt adhesive composition according to the invention has a ring and ball softening point over 80° C., preferably ranging from 90 to 100° C.

The softening point is measured in the same way as that previously described.

The hot-melt adhesive composition has a maximum temperature supported under shearing, or shear adhesion failure temperature (SAFT), over 65° C.

The shear adhesion failure temperature (SAFT) is measured according to the ASTM D4498-07 standard.

Use of the Composition

The hot-melt adhesive composition is used in the preparation of a manufactured article.

Preferably, the hot-melt adhesive composition according to the invention is used for the preparation of packaging, in particular cardboard or plastic packaging, and the preparation of a binding, labeling or edge banding.

Preferably, the hot-melt adhesive composition according to the invention is used for the preparation of packaging, in particular cardboard or plastic packaging, in particular cardboard.

The cardboard or plastic packaging can in particular be a box, crate, bag, tray or pan.

Manufactured Article

The subject of the invention is also a manufactured article comprising an adhesive composition as previously defined.

Preferably, the manufactured article is a package, in particular a cardboard or plastic package, binding, edge banding, ribbon or label.

More preferably, the manufactured article is a package, in particular a cardboard or plastic package, in particular cardboard.

Method for Preparation of a Manufactured Article

The present invention also relates to a method for preparation and/or obtaining a manufactured article as previously defined, comprising at least one step of application of the molten hot-melt adhesive composition, as previously defined, for shaping and or sealing the said article.

Method of Adhering

The invention also deals with a method for bonding one substrate to a similar or different substrate, comprising the application to at least one substrate of a molten hot-melt adhesive composition as previously defined.

The hot-melt adhesive composition is then left to cool. The adhesive hold is almost immediate.

Preferably the adhesive composition is applied to the substrate at a temperature over 100° C., preferably ranging from 100° C. to 190° C.

The following examples serve to illustrate the invention without however being limiting in any way.

EXAMPLES

The tested hot-melt adhesive compositions, described below, are heated to a temperature of 170° C. and after about 30 minutes reach a molten state, meaning they are in liquid form.

When the compositions reach their molten state, they are manually stirred with a glass rod in order to get a homogeneous mixture.

The adhesive compositions are then left at a temperature of 170° C. for one hour until air bubbles are completely eliminated.

Transparency

The transparency of the adhesive compositions is determined by pouring each composition (having the form of a homogeneous mixture) into Petri dishes at a temperature of 170° C. to a depth of about 5 mm.

A word printed in black is placed under the Petri dish and used to give a visual evaluation of the transparency.

Cloud Point

The cloud point or (cloud temperature) appears when the ingredients become incompatible with each other thus giving a cloudy or opaque appearance to the adhesive composition. This appearance is caused by the development of crystals of ingredients from the composition.

The cloud point is measured according to the following protocol:
heat the adhesive composition being studied to get a molten state at a temperature of about 170° C.;
dip the mercury end of a glass thermometer in the center of the molten adhesive composition (i.e. in the bulk of the mixture);
withdraw the thermometer from the composition and then slowly turn the thermometer downward while letting the additional quantity of composition flow into the adhesive composition;
observe the formation of an opacity at the tip of the thermometer; then
record the temperature on the thermometer when the composition becomes cloudy.

Viscosity

The viscosity of the molten hot-melt adhesive compositions is measured with a Brookfield Thermoset viscometer equipped with an SC4-27 spindle according to the NF EN ISO 2555 standard. The measurements are done at a temperature varying from 130 to 170° C.

Shear Adhesion Failure Temperature (SAFT)

The shear adhesion failure temperature (SAFT) consists of testing the hot breaking temperature under shear of hot-melt adhesive compositions. It is measured according to the standard ASTM D4498-07.

The adhesive composition is poured on a flat heating spreader at a temperature range going from 130 to 150° C. so as to form a bubble-free calibrated adhesive film.

The samples (or assemblies) tested are consi of two 100×25 mm$^2$ Kraft paper substrates adhered to each other with the adhesive film over a 25×25 mm$^2$ surface area. The two substrates are sealed at a temperature of 135° C. under a load of 400 DaN for 5 seconds. The samples therefore form an assembly of two substrates bonded to each other by the adhesive film.

The samples are then suspended vertically and loaded with a mass of 500±10 g and then the temperature is progressively increased at a controlled rate of 0.4 C°/minute until the assembly gives way.

The equipment tests five samples simultaneously and records each failure temperature.

The measured temperature therefore corresponds to the maximum temperature supported under shearing.

Softening Point

The softening point measured by the ring and ball method (ring and ball (R&B) softening point) corresponds to the temperature at which the adhesive composition reaches some degree of softening under standardized conditions.

The softening point is measured according to the NF EN 1238 standard.

Polymer and Copolymers Tested

The ethylene and n-butyl acrylate copolymers used in the adhesive compositions tested, from the Lotryl series, are produced in an industrial tubular reaction vessel belonging to Arkema.

The polyethylene prepared by metallocene catalyst used in the adhesive composition tested is sold by Dow under the trade name Affinity GA 1950.

The main characteristics of the ethylene and n-butyl acrylate copolymers belonging to the Lotryl series and the polyethylene sold under the trade name Affinity GA 1950 are summarized in the following table:

The melt flow index (MFI) corresponds to the mass of the molten polymer or copolymer flowing through an oblong shaped extruder standardized using a loaded piston (standard mass of 2160 g) over a given time under given temperature conditions.

The melt flow index of the polymer or copolymer is measured at a temperature of 125° C. in an extruder (capillary) under a load of 325 g and then is extrapolated to a temperature of 190° C. under a load of 2.16 kg.

TABLE 1

Characteristics of the Polymers and Copolymers

| Experimental Conditions | MFI (Flow index) g/10 min | Concentration of n-butyl acrylate FTIR Spectroscopy Units % by weight | Glass transition temperature (° C.) DSC |
|---|---|---|---|
| Lotryl 35BA320T | 320 | 35% | −53 |
| Lotryl A | 460 | 28% | −53 |
| Lotryl B | 650 | 28% | −54 |
| Affinity GA 1950 | 500 | — | −57 |

Transparency and Cloud Point Tests

The selection of a pair made up of an ethylene and n-butyl acrylate copolymer and an adhesive resin for obtaining the best possible adhesive composition consists of determining the clarity and cloud point when molten of the two compounds in mixture each with a concentration of 50% by weight.

Table 2 indicates the transparency of compositions in the Petri dish of a mixture made up of 50% copolymer by weight and 50% hydrocarbon adhesive resin by weight.

The hydrocarbon adhesive resins used are hydrogenated resins sold under the trade names Sukorez SU 100S, Sukorez SU 500, Regalite R1100, Escorez 5380 and Escorez 5400.

TABLE 2

Appearance of Copolymers/Resin Mixtures
Transparency of the mixture of 50% copolymer by weight and 50% adhesive resin by weight at a temperature of 170° C.

| Resin | Sukorez SU 100S | Sukorez SU 500 | Regalite R1100 | Escorez 5380 | Escorez 5400 |
|---|---|---|---|---|---|
| Lotryl 35BA320T | Cloudy | Cloudy | Cloudy | Cloudy | Cloudy |
| Lotryl A | Transparent | Transparent | Transparent | Transparent | Transparent |
| Lotryl B | Transparent | Transparent | Transparent | Transparent | Transparent |

Table 3 indicates the cloud point of a mixture made up of 50% copolymer by weight and 50% hydrocarbon adhesive resin by weight.

TABLE 3

Cloud Point of Copolymers/Resin Mixtures
Cloud point of the mixture of 50% copolymer by weight and 50% adhesive resin by weight

| Resin | Sukorez SU 100S | Sukorez SU 500 | Regalite R1100 | Escorez 5380 | Escorez 5400 |
|---|---|---|---|---|---|
| Lotryl 35BA320T | 120° C. | 110° C. | 104° C. | 120° C. | 115° C. |
| Lotryl A | 80° C. | 60° C. | 50° C. | 60° C. | 90° C. |
| Lotryl B | 75° C. | 60° C. | 50° C. | 60° C. | 80° C. |

Hot-Melt Adhesive Composition

The hot-melt adhesive compositions tested have the following breakdowns:

35% by weight of an ethylene/n-butyl acrylate copolymer;

50% by weight of a hydrogenated hydrocarbon adhesive resin;

14.80% by weight of a wax; and 0.20% by weight of an antioxidant.

The percentages are calculated relative to the total weight of the adhesive composition.

The polyethylene prepared by metallocene (Affinity GA 1950) and the ethylene/n-butyl acrylate copolymers from the Lotryl A and Lotryl B series were formulated with hydrogenated hydrocarbon adhesive resins sold under the names Regalite R1100, Sukorez SU 500 and Escorez 5380 according to the breakdown by weight given above.

Tables 4, 5 and 6 indicate the viscosities in mPa·s, the softening points (° C.) and the maximum temperature supported under shearing (SAFT or shear adhesion failure temperature in ° C.) from various formulations with the Regalite R1100, Sukorez SU 500 and Escorez 5380 adhesive resins.

The results shown in Tables 4, 5 and 6 show that the hot-melt adhesive compositions formulated with ethylene and n-butyl acrylate copolymers conforming to the invention have properties involving viscosity and softening point similar to the adhesive compositions formulated with polyethylene prepared by metallocene.

Table 4 shows that the adhesive compositions conforming to the present invention have a maximum temperature supported under shearing higher than an identical adhesive composition formulated with a polyolefin prepared by metallocene.

TABLE 4

| | Temperature | Composition 1 | Composition 2 | Composition 3 |
|---|---|---|---|---|
| Lotryl A | | 35 | — | — |
| Lotryl B | | — | 35 | — |
| Affinity GA 1950 | | — | — | 35 |
| Regalite R1100 | | 50 | 50 | 50 |
| Wax | | 14.8 | 14.8 | 14.8 |
| Irganox 1010 | | 0.2 | 0.2 | 0.2 |
| Viscosity in mPa · s | 130° C. | 3365 | 2490 | 3325 |
| | 170° C. | 2420 | 1790 | 2263 |
| | 150° C. | 1700 | 1350 | 1715 |
| | 160° C. | 1271 | 1000 | 1285 |
| | 170° C. | 1000 | 750 | 983 |
| Softening point (R&B) | | 93.6 | 95.4 | 94 |
| SAFT (° C.) | | 67 | 68 | 61 |

TABLE 5

|  | Temperature | Composition 4 | Composition 5 | Composition 6 |
|---|---|---|---|---|
| Lotryl A |  | 35 | — | — |
| Lotryl B |  | — | 35 | — |
| Affinity GA 1950 |  | — | — | 35 |
| Sukorez SU 500 |  | 50 | 50 | 50 |
| Wax |  | 14.8 | 14.8 | 14.8 |
| Irganox 1010 |  | 0.2 | 0.2 | 0.2 |
| Viscosity in mPa·s | 130° C. | 3645 | 2535 | 3520 |
|  | 170° C. | 2605 | 1855 | 2540 |
|  | 150° C. | 1933 | 1396 | 1875 |
|  | 160° C. | 1454 | 1067 | 1425 |
|  | 170° C. | 1125 | 817 | 1117 |
| Softening point (R&B) |  | 92.5 | 93.9 | 93.8 |

TABLE 6

|  | Temperature | Composition 7 | Composition 8 | Composition 9 |
|---|---|---|---|---|
| Lotryl A |  | 35 | — | — |
| Lotryl B |  | — | 35 | — |
| Affinity GA 1950 |  | — | — | 35 |
| Escorez 5380 |  | 50 | 50 | 50 |
| Wax |  | 14.8 | 14.8 | 14.8 |
| Irganox 1010 |  | 0.2 | 0.2 | 0.2 |
| Viscosity in mPa·s | 130° C. | 3010 | 2280 | 3205 |
|  | 170° C. | 2265 | 1670 | 3330 |
|  | 150° C. | 1696 | 1250 | 1725 |
|  | 160° C. | 1292 | 958 | 1317 |
|  | 170° C. | 1008 | 758 | 1021 |
| Softening point (R&B) |  | 91.9 | 93.5 | 93.7 |

Aging of Adhesive Compositions

The thermal stability in the molten state of adhesive compositions according to the invention and of the composition containing polyethylene prepared by metallocene was studied over seven days at a temperature of 170° C.

Over a period of seven days at a temperature of 170° C., none of the compositions tested showed the formation of gels or of traces of char. All compositions are transparent from the start (t=0) and also at the end of seven days (t=7 days).

The color of the adhesive compositions was also studied during this period by measuring the yellowing index thereof.

These index measurements are given in color shade in the following tables.

|  | Composition 1 | Composition 2 | Composition 3 |
|---|---|---|---|
| T = 0 | Clear | Clear | Clear |
| T = 1 day | Very light yellow | Very light yellow | Very light yellow |
| T = 2 days | Very light yellow Amber | Very light yellow Amber | Amber |
| T = 7 days | Amber | Amber | Dark amber |

The results show the compositions 1 and 2 according to the invention remain clear longer than composition 3 whose color degrades more quickly.

These last results show that the ethylene and n-butyl acrylate copolymers according to the invention confer more advantageous properties to the hot-melt adhesive compositions than those conferred by a polyolefin prepared by metallocene.

The invention claimed is:

1. A thermo-fusible adhesive composition comprising at least one cohesion agent, the agent comprising at least one copolymer of ethylene and n-butyl acrylate having a melt flow index of 460 to 650 g/10 minutes, measured at a temperature of 190° C., and having a content of 26 to 29% by weight of n-butyl acrylate, calculated with respect to total weight of the copolymer of ethylene and n-butyl acrylate,
    wherein the thermo-fusible adhesive composition further comprises:
        only one wax chosen from the group consisting of mixtures of paraffin wax and Fisher-Tropsch waxes, the mixtures containing at most 10 wt % of Fisher-Tropsch waxes; and
        an aliphatic-modified aromatic hydrogenated hydrocarbon adhesive resin, different from the cohesion agent, is present in a content ranging from 40 to 60% by weight, relative to the total weight of the composition,
    wherein the copolymer of ethylene and n-butyl acrylate is present in the thermo-fusible adhesive composition in a content ranging from 30 to 40% by weight, relative to the total weight of the composition,
    wherein the composition does not comprise a copolymer of ethylene and vinyl acetate, and the cloud point of the mixture made up of 50% by weight of the at least one copolymer and 50% by weight of the at least one hydrogenated hydrocarbon adhesive is from 50° C. to 90° C., and
    wherein the composition is transparent in a molten state when poured at a depth of 5 mm.

2. The thermo-fusible adhesive composition according to claim 1, wherein the copolymer of ethylene and n-butyl acrylate comprises 28% by weight of n-butyl acrylate relative to the total weight of the copolymer of ethylene and n-butyl acrylate.

3. The composition according to claim 1, wherein the composition has a viscosity ranging from 300 to 1500 mPa·s, measured at a temperature of 170° C.

4. An article of manufacture comprising a thermo-fusible adhesive composition according to claim 1.

5. The article of manufacture of claim 4, wherein the article comprises a package, a binding, a labeling or a banding.

* * * * *